United States Patent [19]

Bradshaw

[11] 4,173,125

[45] Nov. 6, 1979

[54] ENERGY RECOVERY SYSTEM

[75] Inventor: Norman F. Bradshaw, Richmond, England

[73] Assignee: Schweitzer Industrial Corporation, Madison Heights, Mich.

[21] Appl. No.: 887,156

[22] Filed: Mar. 16, 1978

[51] Int. Cl.² ........................ F25B 7/00; F25B 27/02
[52] U.S. Cl. .................................... 62/79; 62/238; 165/62
[58] Field of Search ............. 165/62; 237/2 B; 62/79, 62/238

[56] References Cited

U.S. PATENT DOCUMENTS

| | | | |
|---|---|---|---|
| 3,276,516 | 10/1966 | Japhet | 165/62 |
| 3,523,575 | 8/1970 | Olivieri | 165/62 |
| 3,935,899 | 2/1976 | Jolly | 165/62 |
| 4,041,724 | 8/1977 | Gustafsson | 62/79 |
| 4,049,045 | 9/1977 | Moog et al. | 62/238 E |

Primary Examiner—Lloyd L. King
Attorney, Agent, or Firm—Krass & Young

[57] ABSTRACT

An energy recovery system for industrial plants or similar installations providing for recovery and utilization of heat from relatively low temperature waste heat sources. The system includes refrigeration units operated as heat pumps to absorb the recovered heat from each of the sources in the evaporator and transfer heat to heat-using processes from the condenser. The heat transfer media circulated from and to the evaporator and condenser are accumulated in thermal storage tanks which allow for maintenance of temperature gradations in the media to allow control of the condenser operating temperature and in order to recover the maximum thermal energy from the media received from various recovery heat exchanger units. Various arrangements for maintaining and utilizing the thermal temperature gradations in the storage tanks include vertically offset inlets and outlets or vertically extending movable probes with the media withdrawn and introduced at various levels therethrough and thermal stratification creating the temperature differences. The storage tanks are alternately provided with weirs to form horizontally spaced compartments each having heat transfer liquids at varying temperatures in the respective compartments. In one embodiment, a plurality of heat pump units are arranged in cascade relationship with a plurality of thermal storage tanks receiving circulated media flow about successive condenser and evaporators in the cascade to maximize heat pump efficiency.

20 Claims, 7 Drawing Figures

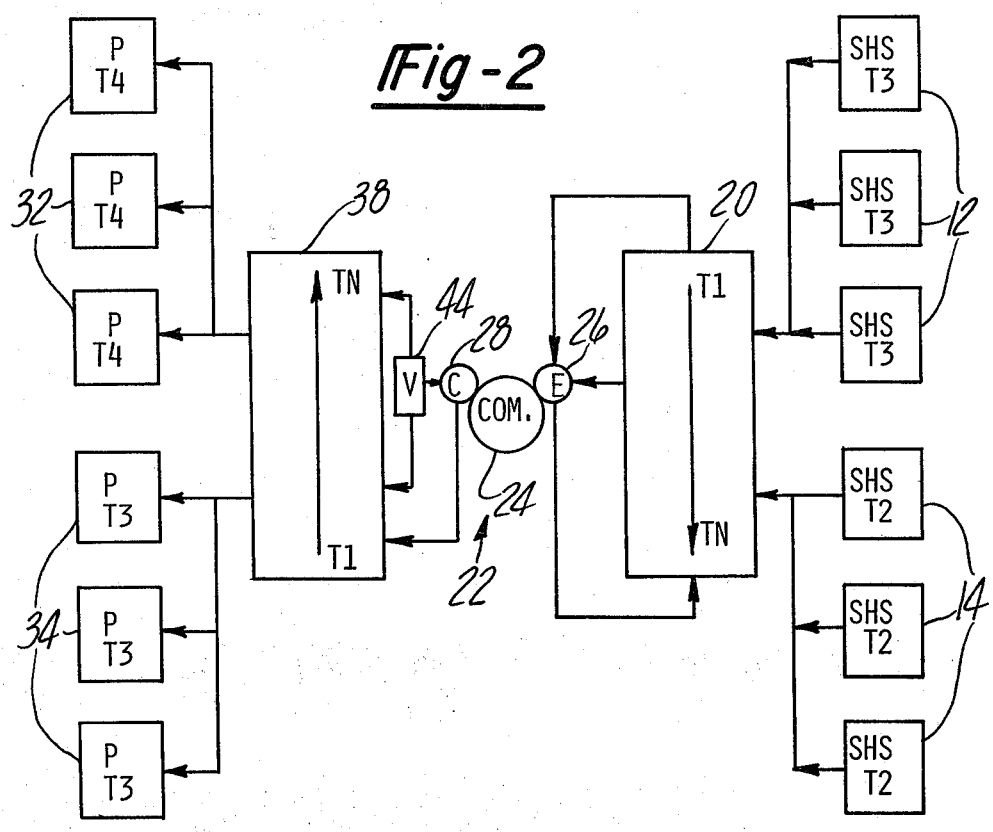
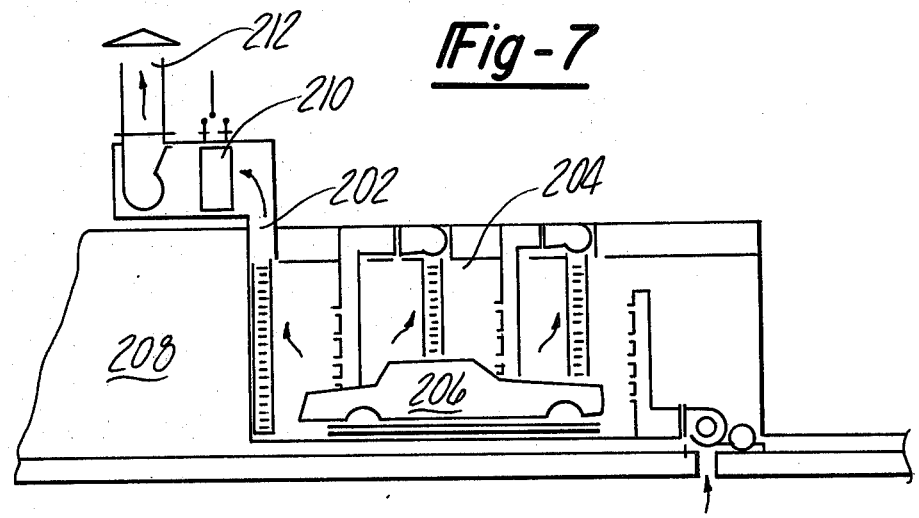

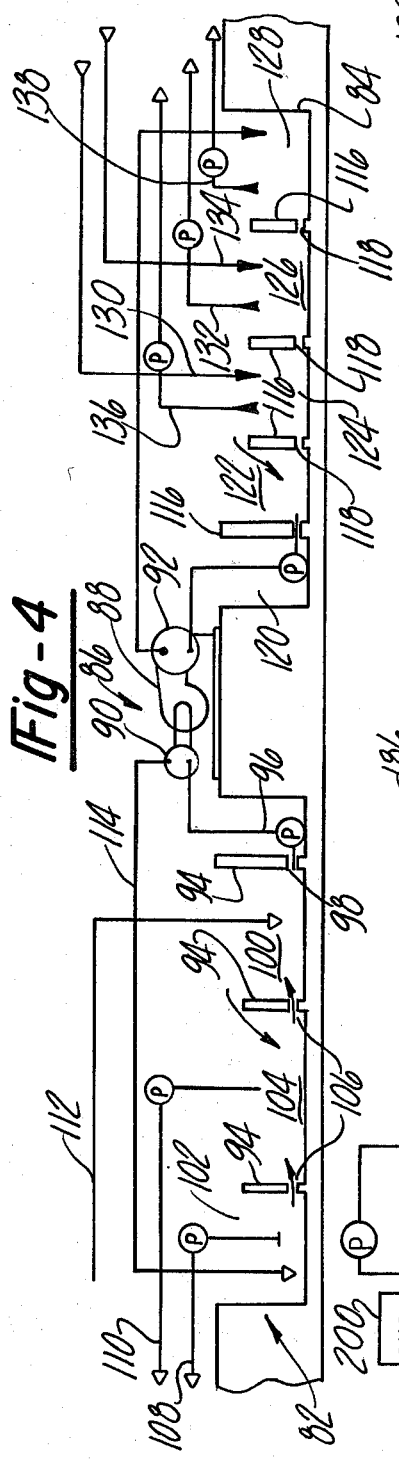
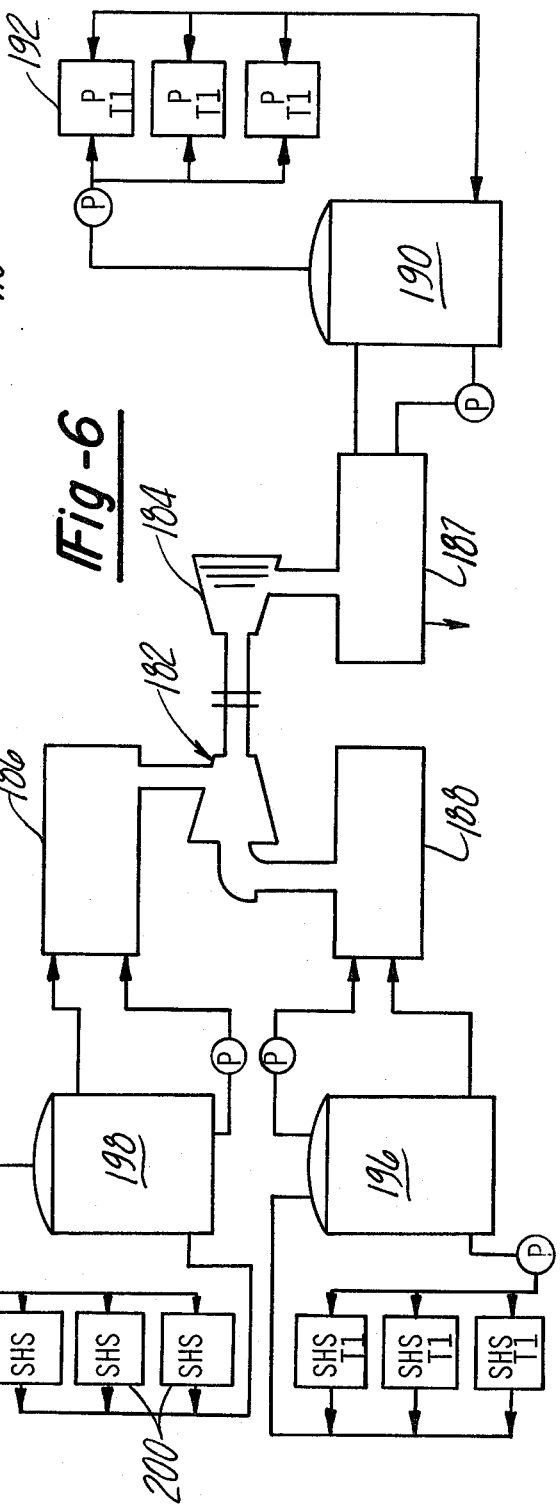

ENERGY RECOVERY SYSTEM

BACKGROUND DISCUSSION

Modern industrial plant operations generate considerable heatwaste by the rejection of heat from various processes at relatively low temperatures, which low temperatures heretofore have precluded effective recovery of the energy. Typical examples include the warm air discharge from paint curing ovens, heat rejected from condensers of refrigeration units, air exhausted from paint spray booths, or simply ventilating air exhausted to the atmosphere during cold weather conditions.

With the greatly increased cost of energy and its sharply reduced availability, it would of course be highly desirable to recover or utilize energy from every possible source such as the heat normally given off from these sources.

As noted, the chief factor which prevents heat recovery in such situations is the relatively low temperatures of the medium from which the heat must be recovered, such as air exhausted from the paint spray booths. The low temperatures make it difficult to utilize the energy since the necessary temperature differentials for performing useful work in most industrial processes cannot be achieved and also limits the rate of heat transfer from the source at an inadequate rate.

Another major factor is the fact that each of such potential energy sources may yield modest energy levels which may not of itself be sufficient to be directly economically applicable to some other industrial applications.

While it is possible and has heretofore been carried out, the designing of various subsystems which utilized heat energy recovered at one point in the system are not related and, as noted, may in and of themselves be relatively insignificant.

Furthermore, if each energy source were coupled with an energy use process, the necessary balance between the heat energy generated by the energy source and the demand for heat energy required by the application may not be in balance, requiring a supplemental energy source in order to meet the energy demands of the application. This may be occurring at the same time that another heat utilizing subsystem may be in a state of imbalance in which an excess of heat is being recovered over that required by the system in which case the energy must be dissipated and is lost to the overall plant energy equation. In the event a central energy collection and use system is conceived, other difficulties arise.

Firstly, the temperature of the recovery or "collection" heat transfer media from a wide variety of diverse heat energy sources would almost necessarily be at various temperatures in order to achieve maximum energy recovery. The temperature of the respective collection heat transfer media should be preserved to the maximum extent practical during collection and use of the energy. That is, in a central accumulator tank, for example, all of the liquids would be merely collected in a common tank. The higher temperature media would be cooled upon being mixed in the storage tank, compromising the efficiency of heat energy recovery from the relatively higher temperature heat sources.

The second difficulty is in the utilization of the heat energy collected by such a recovery system. Many potential applications for such recovered heat energy may require a heat transfer medium to be within a relatively narrow temperature range and may have varying temperature requirements. Accordingly, any such recovery systems should have a capability for delivering the heat transfer medium through a temperature range such that it may be suited to the particular application.

Yet another difficulty arises from the poor quality of the air in many industrial plants with the air being in a form from which the energy is sought to be reclaimed. Any heat extraction arrangement would of necessity require relatively elaborate filtration prior to circulation through heat exchangers in order to keep maintenance requirements within reason.

However, with the recently imposed, much more stringent air pollution standards, filtration units are often now required in any event such that the heat energy from warmed air within the factory should now allow heat extraction therefrom since such filtration units will provide sufficiently clean air such as to enable use of relatively low cost heat exchanger units.

Accordingly, it is an object of the present invention to provide an energy recovery system for industrial plants or similar applications in which the energy is recovered from a large number of diverse, unrelated secondary heat sources in which the heat energy is recovered from a relatively low temperature media.

It is a further object of the present invention to provide a system for collecting heat energy from such sources and utilizing heat energy with a centralized recovery system, which may also act as a thermal accumulator, smoothing out the heat demands and allowing continuous operation of the related equipment.

It is yet another object of the present invention to provide such centralized heat recovery in which differing temperatures of the collecting heat transfer media are maintained to afford maximum efficiency of the energy recovery process.

It is still another object of the present invention to provide such a centralized energy recovery system in which the heat energy may be delivered to various process applications at controllable temperature levels of the heat transfer media.

SUMMARY OF THE INVENTION

These and other objects of the present invention, which will become apparent upon a reading of the following specification and claims, are accomplished by combining heat collection heat exchangers which transfer heat from the secondary heat energy sources to the evaporator of a refrigeration unit which is operated as a heat pump. The low temperature of the refrigeration unit allows transfer of heat energy at the low temperatures of the collection heat transfer media circulated between the heat exchangers and the evaporator. The heat transfer media circulated through each of the heat exchangers is collected in a thermal storage tank in which the temperature of the medium is gradated to enable collection of each of the circulated media at differing temperatures and maintenance of the temperature with the storage tank. Heat transferred out of the refrigeration unit is utilized in a process application by heat transfer media circulated through the condenser. The media circulated through the condenser is likewise collected in a thermal storage tank in which temperature gradations are maintained such that the temperature of the media withdrawn to be circulated about the condenser may be controlled in order to maintain maximum efficiency of a refrigeration unit. This also allows the circulation of the process heat transfer media at predetermined temperature levels to other heat using process applications. Evaporative cooling towers and supplemental heating means are utilized in order to insure balance between process demands and the heat recovered by collection of the heat energy.

The operation of the refrigeration unit also may be utilized to provide building heating and cooling.

The temperature gradation may be achieved by the use of individual separate storage tanks in which are maintained media at different temperatures, or thermal stratification within single tanks may achieve the same end. Alternatively, storage tanks are provided having spaced weirs to define compartments in which the media may be maintained at differing temperatures.

Media in each of the thermal storage tanks may be circulated to successive evaporators and condensers in conjunction with the cascaded heat pump units to achieve maximum efficiency of the heat pumps.

The use of a liquid media and thermal storage tank as well as collection mains comprises a thermal accumulator, smoothing out heat demands and enabling continuous operation of the equipment.

DESCRIPTION OF THE DRAWINGS

FIG. 2 is a diagrammatic representation of a portion of the energy recovery system depicted in FIG. 1 and depicting an alternate embodiment of the components shown in FIG. 1.

FIG. 4 is a diagrammatic representation of another embodiment of the system components shown in FIGS. 2 and 3.

FIG. 6 is a diagrammatic representation of another form of the energy recovery system depicted in FIGS. 1 through 5.

FIG. 7 is a diagrammatic representation of an energy recovery unit installation of the type integrated into the energy recovery system according to the present invention.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, the heat energy collected at relatively moderate temperatures from "low grade" heat sources is transformed into a form in which sufficient temperature differentials exist, i.e., thermal head, so as to enable utilization in a process application by the use of a refrigeration device. This device is of the type having an evaporator and a condenser, with a refrigerant caused to be circulated to the condenser where it is condensed, and then evaporated in the evaporator to produce transfer of heat from the evaporator to the condenser.

The refrigeration device, according to the present invention, is utilized as a heat pump to "pump" the thermal energy recovered from the low grade heat sources up to a temperature level at which a thermal head exists sufficient to be used in typical processes. The transference of the heat energy from the secondary heat sources into the evaporator effectively allows utilization of the energy recovered from the secondary heat sources.

The heat energy released in the condenser may then be utilized in order to perform the process functions such as the building heating; heating of the water for various uses; heating of the air in specific processes such as paint spray booths used in paint finishing operations; or any other of the various plant processes requiring heat energy.

Figure 1:
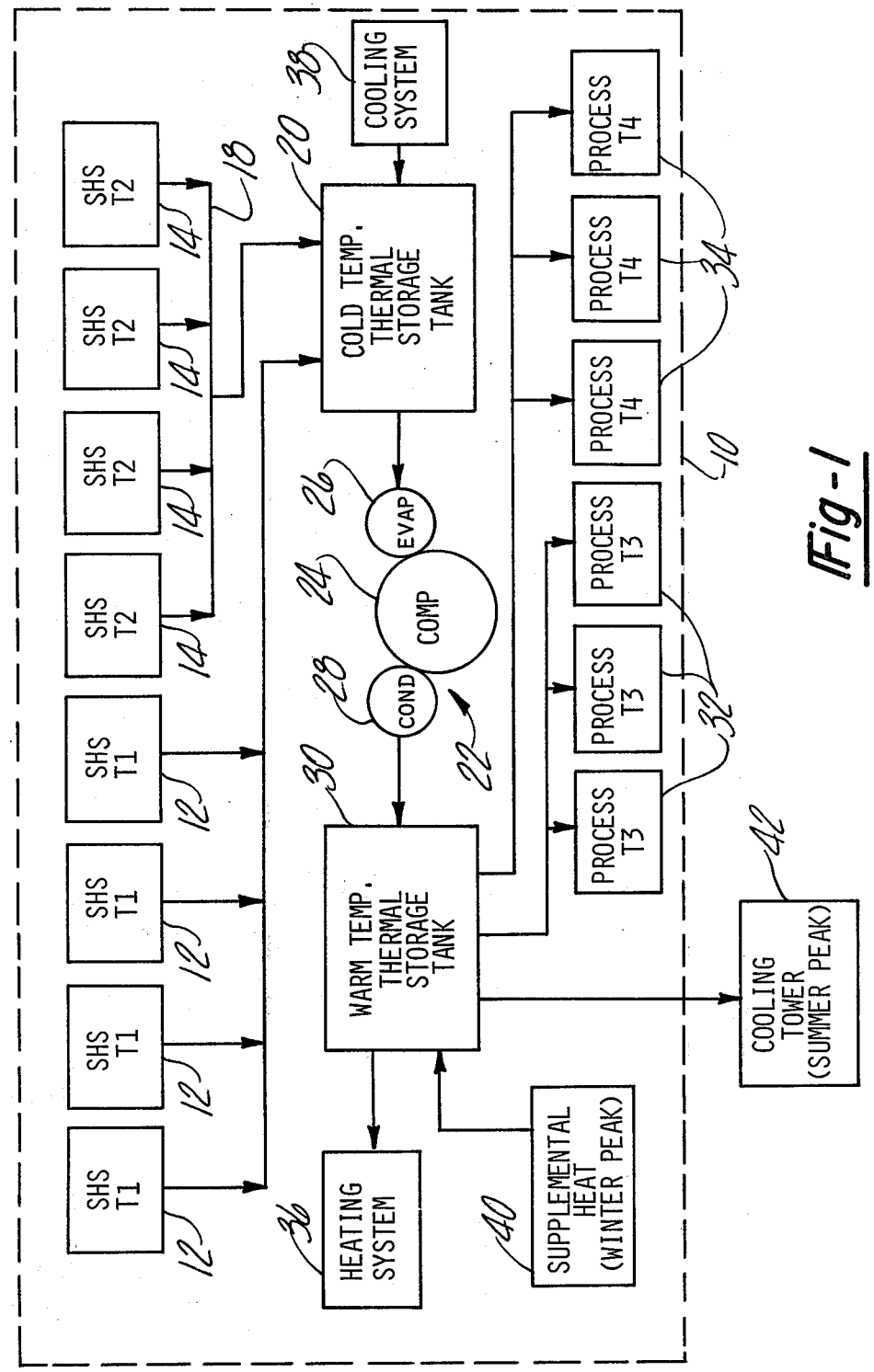
FIG. 1 is a diagrammatic representation of the energy recovery system according to the present invention.

FIG. 1 depicts in diagrammatic form the arrangement of such a system supplied to a plant wide energy recovery system in which there is a large number of secondary heat sources (SHS) which collect heat energy at various heat transfer media temperatures $T_1$, $T_2$, and which plant utilizes heat energy in process devices (P) at various temperature levels of the heat transfer media $T_3$, $T_4$.

In FIG. 1, the rectangle 10 diagrammatically represents the plant system or other similar installations involving a plurality of diverse unrelated or related secondary heat sources and heat utilization processes P. The secondary heat sources 12 represent those heat sources in which a collection heat transfer medium would be at a similar temperature ($T_1$), whereas the secondary heat sources 14 would be at some differing temperature ($T_2$).

The heat energy of the secondary heat sources would be collected by heat transfer collector means consisting of collector heat exchangers. In a typical application, air-to-liquid heat exchangers are used in which the heated air would be passed through the heat exchanger to warm a heat transfer medium such as water, with all of the circulated media of a temperature $T_1$ being collected in the main 16, and all of the heat transfer media of a differing temperature range $T_2$ collected into a common main 18. Additional mains can be added depending on the particular requirements of a given system.

The arrows indicated in FIG. 1 represent the direction of heat flow and in practice it is understood that normally a fluid circuit would be provided with inlet and return lines to circulate a liquid through the various heat exchangers and process devices. For the sake of simplicity, the diagrammatic representation of FIG. 1 broadly indicates the direction of heat transfer.

The heat transfer media from the various mains 16 and 18 are collected into a cold temperature thermal storage tank 20, which in effect provides a centralized thermal accumulator for accumulating the circulated liquids from all of the plurality of secondary heat sources 12 and 14.

As will be described hereinafter in regards to various other embodiments and refinements thereof, the cold temperature thermal storage tank 20 may provide for collection of the respective heat transfer media at differing temperatures so as to preserve the temperature differences rather than intermixing these media. For the purposes of the description of FIG. 1, this is represented by the cold temperature thermal storage tank 20.

The heat energy collected in the liquids so circulated, according to the concept of the present invention, is recovered in conjunction with a refrigeration unit or units 22 which are operated as a heat pump. Such a heat pump may be a mechanical refrigerator or refrigerators, consisting of a compressor 24, evaporator 26 and condenser 28. A refrigerant is compressed by the compressor 24, condensed in the condenser 28 and allowed to vaporize in the evaporator 26, then again being recompressed in the compressor 24, all in the fashion well known in the art.

The resultant change of state causes the release of heat from the condenser 28 and the absorption of heat in the evaporator 26, which in effect "pumps" or transfers heat against the temperature differential from the evaporator 26 to the condenser 28.

The liquid collected in the cold temperature thermal storage tank 20 is caused to circulate through the evaporator 26 such that the heat energy contained in the liquid heat transfer medium in the cold temperature thermal storage tank 20 is transferred into the evaporator 26. Thus, the heat energy from the secondary heat sources 12 and 14 is transferred into the evaporator 26, since the temperatures at which the evaporator 26 operates are relatively low and thus there is ample temperature differentials between the heat transfer media collected in the cold temperature thermal storage tank 20 and the evaporator 26 to insure rapid transfer of this heat energy into the evaporator 26.

The heat energy so collected in turn is "pumped" to the higher temperature levels by the refrigerator in the condenser 28 such as to be practically usable in typical heat using processes.

According to the concept of the present invention, this heat energy is collected in a warm temperature thermal storage tank 30 which receives the heat transfer medium circulated through the condenser 28 to accumulate the heat energy given off in the condenser 28 in the warm temperature thermal storage tank 30. This heat energy is utilized by utilization devices P in which processes are carried out requiring heat energy indicated by 32 and 34 at differing temperatures indicated at $T_3$ and $T_4$.

As depicted in the following FIGURES, means are also provided for allowing the heat transfer medium in the warm temperature thermal storage tank 30 to be withdrawn at controllable differing temperatures so as to be tailored to required process temperatures $T_3$, $T_4$.

This temperature control is further contemplated for the recirculation of liquids from the warm temperatures thermal storage tank 30 through the condenser 28 in order to achieve optimum condenser 28 operating temperature by an arrangement to be disclosed hereinafter.

The heat energy generated in the condenser 28 and stored in the warm temperature thermal storage tank 30 may be used in the building heating system indicated at 36 by appropriate circulation of the liquid of the heat transfer medium from the warm temperature thermal storage tank 30. Similarly, the chilled liquid circulated through the evaporator 26 and accummulated in the cold temperature thermal storage tank 20 may be utilized in the building cooling system 38.

Indeed, the system according to the present invention may be advantageously integrated with the building heating-cooling system such that the required refrigeration units will serve the heating and cooling needs of the plant building such that the capital expense thereof would be largely offset by its replacement of the normal heating and cooling system, while achieving the energy savings indicated by the collection of heat from the secondary heat sources 12 and 14.

In order to balance the overall heat equation for the plant, there is provided a supplemental heat source such as a boiler 40 which serves to add in heat to the warm temperature thermal storage tank 30 when the usage of heat in the building heating system 36 and the processes 32 and 34 exceed the heat input received from the condenser 28.

Similarly, a cooling tower 42 or other such supplemental cooling means is incorporated to dissipate heat from the warm temperature thermal storage tank heat transfer medium when the overall balance between the recovery of heat from the secondary heat sources 12 and 14 (and from the building cooling system 38) exceeds the usage of heat in the processes 32 and 34. Typically, this would be brought into operation during summer peak conditions when heat usage is at a minimum and cooling needs at a peak.

The efficiency realized by this arrangement over having subsystems which are designed to incorporate heat recovery and usage in the same subsystem is that an overall plant energy balance is achieved such that the only heat which needs to be added or rejected is that indicated by the overall balance of heat usage and generation in the plant.

It can also be seen that the various problems associated with low grade heat energy source recovery as described above are overcome by this approach. The temperature differential between the heat recovery and heat transfer media collected in mains 16 and 18 is adequate to insure a reasonable rate of heat transfer into the evaporator 26 since the temperature thereof is at much lower levels. The overall plant heat energy balance efficiencies accruing therefrom is achieved by collecting all of the heat energy into a common centralized thermal accumulator and balancing such collected heat energy against an overall plant heat utilizing process, the centralized warm temperature thermal storage tank 30 providing the source for all such heat usage.

The use of the refrigeration equipment as a heat pump to provide both the cooling and heating needs for the building enables this system to be implemented without a large increase in capital expense over that required in conventional designs.

As mentioned above, the concept calls for a means for both delivering the heat transfer medium from the various secondary heat sources 12 and 14 to the cold temperature thermal storage tank 20 in a manner such that the temperature level of the particular secondary heat source medium is maintained in the cold temperature thermal storage tank 20. This enables the maximum utilization of the collected heat energy.

Similarly, the arrangement for the warm temperature thermal storage tank 30 requires the delivery of the heat transfer medium at controllable temperatures other than merely the coincidental temperatures at which the transfer of heat from the condenser into the various heat using processes and heating loads would yield. Additionally, the operation of compressor 24, particularly centrifugal compressors, requires a fairly close control over the condenser 28 operating temperature for maximum efficiency and running stability of the compressor 24.

FIG. 2 shows an arrangement for achieving this end without wasting any of the recovered heat energy. In this case, the cold temperature and warm temperature thermal storage tanks 20 and 30, respectively, are configured to have their main dimensions vertically extending, such that a temperature stratification within each tank may take place due to the difference in densities of typical liquids such as water at the respective differing temperatures. The vertical level within each tank accordingly contains the liquid at varying temperature levels. The cold temperature thermal storage tank 20 may thus have circulating pump outlets vertically offset such as to introduce the return liquid from the respective secondary heat sources 12 and 14 at an appropriate level corresponding to the relative temperatures of the liquids. The stratification within the cold temperature thermal storage tank 20 prevents to a large degree mixing of the varying temperature heat transfer liquids affording a segregation means such as to maintain their temperature levels and achieve maximum realization of the energy potential recoverable therefrom.

The flow of liquid through the evaporator 26 is such that the cold temperature liquid returning from the evaporator 26 is introduced at the lower region thereof and the warmest liquid is withdrawn for circulation about the evaporator 26 for maximum heat transfer.

Similarly, with the warm temperature thermal storage tank 30, the temperature stratification allows the withdrawal of liquid at varying temperatures. The liquid circulated through the condenser 28 may be temperature controlled by means of a mixing valve 44 receiving liquids at two differing vertical levels in order to achieve an appropriate temperature for optimum condenser 28 operating temperature.

Suitable temperature sensors and controls are employed to achieve automatic regulation of the end result as will be set forth in another embodiment to be described below.

The liquids withdrawn for circulation to the heat utilizing processes 32 and 34 similarly can be supplied with liquid at a specific temperature by appropriate positioning of the suctions of the pumps utilized to circulate the liquids to each of the processes 32 and 34.

Figure 3:
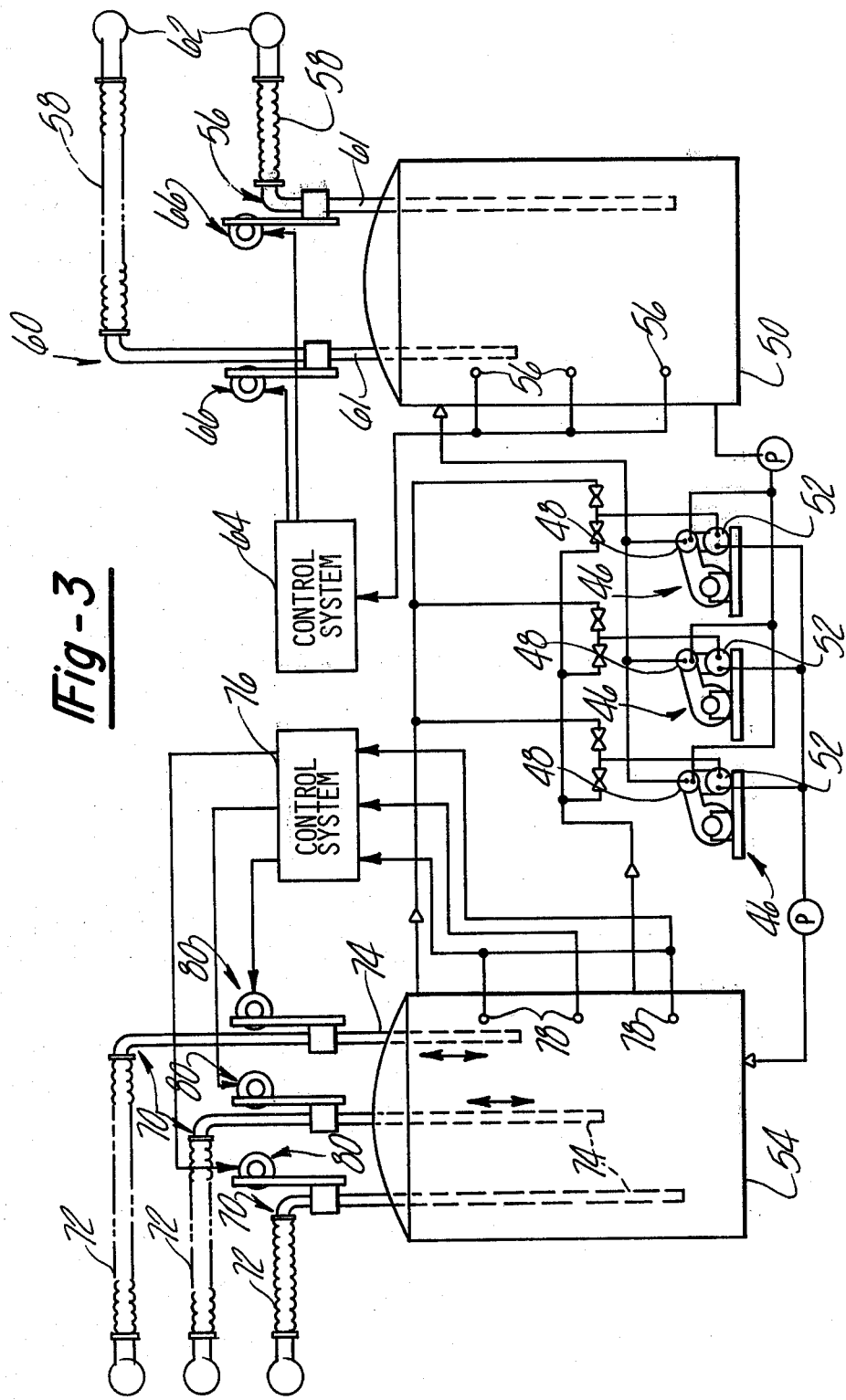
FIG. 3 is a diagrammatic representation of another embodiment of the components depicted in FIG. 2.

A second arrangement for achieving this same result is depicted in FIG. 3. In this arrangement, a plurality of heat pump units 46 are provided with each of the condensers 48 receiving a common supply of liquid circulated to the warm temperature thermal storage tank 50 and the evaporator 52 receiving flow of liquid from the cold temperature thermal storage tank 54. The warm temperature thermal storage tank 50 and the cold temperature thermal storage tank 54 are vertically upstanding such as to provide the temperature stratification described in connection with FIG. 2. In this embodiment, the liquid flow is withdrawn from the warm temperature thermal storage tank 50 by means of variably positioned probe assemblies 60 which extend vertically into the interior of the warm temperature thermal storage tank 50 at differing depths as shown. Deflectable sections 58 connect the vertically extending probes 61 with liquid headers 62 which direct the liquid to the various heat using components as in the above-described embodiments. The vertically extending probes 61 may be mounted for vertical movement under the control of a control system 64 acting on a suitable actuation mechanism 66 such as a rack an pinion and motor drive shown, which operates to move either of the probe assemblies 60 up and down within the warm temperature thermal storage tank 50, to either vary the temperature of the liquid withdrawn, or to maintain the temperature at a given level as the temperature values vary within the warm temperature thermal storage tank 50. The controls may thus sense the temperature levels in the tank by means of one or more temperature sensors 56 positioned to sense the liquid temperature within the warm temperature thermal storage tank 50.

The liquid is circulated through the respective condenser 48 as before, or alternatively, a dual inlet to the condenser 48 may be provided with a modulating valve as described in FIG. 2.

Similarly, the cold temperature thermal storage tank 54 is equipped with a plurality of probe assemblies 70 including deflectable section 72 and rigid vertically extending probes 74 which extend into the cold temperature thermal storage tank 54. These are likewise adjustable in position vertically within the tank in order to vary the temperature of the liquid withdrawn or to maintain the temperature constant, as the temperature of the liquid varies. This movement is carried out by means of a control system 76 which receives temperature information from temperature sensor 78 and causing actuation mechanism 80 to be activated to vary the vertical positioning of each of the vertically extending probes 74.

FIG. 4 depicts an alternate approach for providing quantities of the heat transfer medium at varying temperatures within the thermal storge tanks. As before, a cold temperature reservoir 82 is provided as well as a similar corresponding warm temperature reservoir 84. A heat pump unit or units 86 are provided with a compressor 88, evaporator 90 and condenser 92. In this case, the cold temperature reservoir 82 is provided with a plurality of weir plates 94 which segregate the cold temperature reservoir 82 into respective compartments 100, 102 and 104 retaining liquid at varying temperatures. This is achieved by introducing the chilled liquid from the evaporator 90 at the first compartment 102, allowing communication through bottom openings 106 and also over the top of the weirs 94 with second and third compartments 104 and 100. The return to the evaporator 90 is pumped from compartment 100. The supply connections for the liquid to the various heat recovery mains are located in the liquid containing compartments 102 and 104, and distributed by the mains 108 and 110, whereas the return is introduced by main 112 into compartment 100. The line 96 conveys the liquid to be circulated through evaporator 90 from the compartment 100 via connections 98.

Similarly, the warm temperature reservoir 84 is provided with a series of weir plates 116 which divide the reservoir into respective compartments 112, 124, 126 and 128, in which the temperature of the liquid contained therein varies. Equalizing flow is permitted through openings 118 and over the weir plates 116 between the various compartments 122, 124, 126 and 128. The liquid is circulated around the condenser 92 with the inlet drawing liquid from one end of the warm temperature reservoir 84 from compartment 122 and discharging the same into the end compartment 128 such that the flow through or over weir plates 116 creates gradations of varying temperature liquid in the compartments.

This arrangement allows the introduction of liquid as from lines 130, and 134 from the various secondary heat source exchangers and withdrawal of liquid from varying temperature compartments for the heat user systems by line 138, 136 and 134 at the appropriate temperatures. The varying temperature compartments in the warm temperature reservoir 84 allows controlled temperature delivery as in the above embodiments. The weir plates 94 and 116 act as weirs in the event the liquid is introduced into one compartment at a rate greater than equalizing flow can accommodate such that overflow occurs to maintain a reasonable balance of liquid level in the respective compartments.

Figure 5:
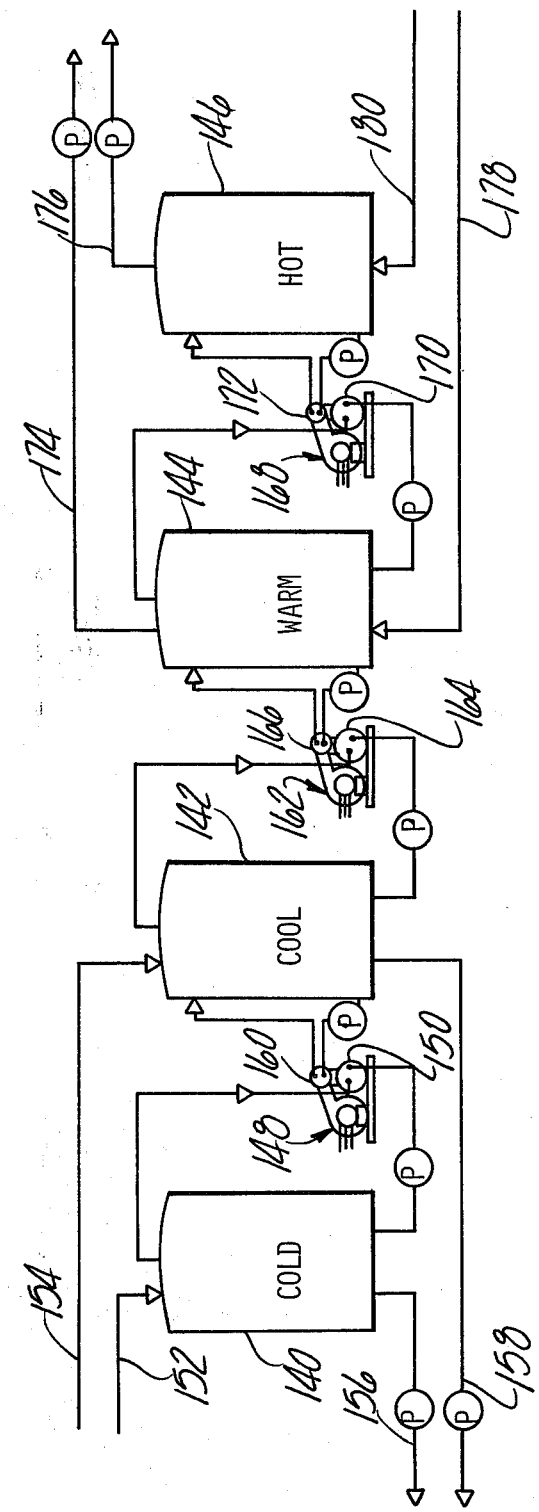
FIG. 5 is a diagrammatic representation of an alternate arrangement of the thermal storage tanks and refrigeration units utilized in the system of FIG. 1.

The energy recovery system may be combined with a plurality of heat pump units arranged in a cascade relationship to optimize the operating efficiency of the units by the arrangement depicted in FIG. 5. In this arrangement, cold and cool temperature thermal storage tanks 140 and 142, respectively, are employed, as well as warm and hot temperature thermal storage tanks 144 and 146, respectively, in order to provide a degree of variability of the temperature of the liquids.

A first heat pump unit 148 is provided with an evaporator 150 having liquid circulated therethrough introduced into the cold temperature thermal storage tank 140 at the lower level thereof, and receiving warmer liquid from the upper levels of the cold temperature thermal storage tank 140. The heat recovery mains 152 and 154 return the warmed liquid from the secondary heat sources into respective thermal storage tanks 140 and 142 with the appropriate temperature matching thereof as in the stratified tank embodiments described above. The cooling system mains withdraw from the lower levels of the cold temperature thermal storage tank 140 and the cool temperature thermal storage tank 142, respectively, via mains 156 and 158.

At the same time, the condenser 160 of the heat pump unit 148 rejects the heat generated therein to a liquid circulated into the cool temperature thermal storage tank 142.

In turn, the successive heat pump unit 162 receives liquid circulated through evaporator 164 from the cool temperature thermal storage tank 142 such that the heat energy collected over heat recovery mains 152 and 154 is transferred into the condenser 166 of the heat pump unit 162.

The condenser 166 of the heat pump unit 162 rejects its heat to a liquid circulated into the warm temperature thermal storage tank 144. A final stage of heat pump unit 168 receives liquid from the warm temperature thermal storage tank 144 circulated about its evaporator 170 while the condenser 172 rejects its heat through the final hot temperature thermal storage tank 146. The process mains 174 and 176 are provided to withdraw liquid from the respective thermal storage tanks 144 and 146 to match the temperature requirements of respective heat using processes.

This cascade arrangement allows the thermal pumping up of the temperatures by the cascade coupling of the respective condensers and evaporators to produce highly efficient heat pump operation and also the availability of variations in the cold temperature heat transfer media and the warm temperature heat transfer media for the efficient integration into the system described above.

FIG. 6 depicts in diagrammatic form a system in which a steam turbine is utilized to drive the refrigeration compressor, and an arrangement is depicted for reclaiming the heat content of the steam after being passed through the turbine. This includes the centrifugal or positive displacement compressor 182, driven by a steam turbine 184, the compressor 182 compressing the refrigerant into the condenser 186 from the evaporator 188. The steam which is passed through the turbine 184 is collected in a heat exchanger 187 through which is circulated a heat transfer medium preferably a liquid such as water to absorb the heat and cause the steam to condense to thus recover most of the heat energy still contained in the steam after passing through the turbine 184. The liquid so circulated is collected in a thermal storage tank 190 to provide an energy recovery means associated with the turbine. The medium contained therein may be circulated to a series of heat using process devices 192 in which the relatively high temperature thermal transfer medium may perform a useful low grade heating function.

Accordingly, the system may be coupled with an auxiliary heat recovery arrangement in which the pumping of the heat energy by a refrigeration unit is not required in order to directly recover the heat energy normally wasted.

The other secondary heat sources 194 comprise heat exchangers serving to collect relatively low temperature fluid circulated into a thermal storage tank 196, which serves as a reservoir for a liquid circulated around the evaporator 188 to recover the relatively low grade heat energy. Similarly, the heat rejected in condenser 186 may be recovered by circulation of a heat transfer medium into a thermal storage tank 198 which provides a thermal reservoir for the other utilization devices 200 which extract the heat energy from the liquid circulated out of the thermal storage tank 198 such that the concept of the above system can be applied to other more conventional energy recovery arrangements.

FIG. 7 depicts a typical secondary heat source in which the air circulated through a body cooler commonly utilized in paint finishing operations collects the air of the outlet duct 202 which receives air passing through a body cooler enclosure 204. The air passing out through the outlet duct 202 is warmed, having been heated by contact with the car body 206 which had been previously raised to an elevated temperature in an oven 208 utilized to cure the paint after paint finishing operations have been performed thereon. A heat exchanger 210, typically an air-to-liquid heat exchanger, would be positioned to receive the air passing therethrough which heats a heat transfer medium such as a liquid circulated therein which is then collected in these heat energy recovery systems according to the present invention. The air is then exhausted at a substantially lower temperature through the exhaust stack 212.

A similar arrangement can be utilized to receive recovery heat from secondary heat sources in numerous diverse plant operations, which according to the concept of the present invention, would be collected by means of the disclosed system and utilized in other process applications throughout the plant as well as for serving partially as the heating energy for the building. Accordingly, it can be seen that the above recited objects of the present invention have been achieved by this system arrangement and that the relatively low grade heat energy has been recovered by use of the temperature differential created by the use of heat pump units and further that the specific recovery of the heat energy allows a maintenance of the temperature levels of the heat transfer media such as to maximize the recovery of energy therefrom.

Further, the arrangement allows the use of heat transfer media at varying temperatures to match the requirements of the various process applications to that of the media circulating from the central storage tank and also allows the control of the condenser operating temperatures for maximum heat pump efficiency.

The concept of collecting all of the secondary heat sources into a central system and the utilization and distribution of this heat energy for the various process applications means that a supplemental heating and cooling is only required in order to make up the overall plantwide energy imbalance, such that the inefficiencies which would result in a large number of subsystems of energy recovery and use are avoided. The additional equipment required is not great since the heat pump units can be utilized as the building heating and cooling equipment such that the net capital expense increase in relatively modest.

The entire system involving a liquid media, mains, and storage tanks act as thermal accumulators to smooth out and balance heat collections and usage due to the great quantity of heat stored in a typical system. This allows more continuous operation of the various equipment involved to avoid the thermal inefficiencies of intermittent operation.

It is noted that many of the components of such a system of conventional nature have been omitted in the above description since the same is not part of the present invention and the manner of integration into such system is well within the skill of those skilled in this field. Examples of these are the various pumps, valves, plumbing, control circuits, air filtration units, etc., as well as the specific components normally incorporated in the heat pump units, i.e., expansion valves, etc. A description of the details thereof are similarly not necessary for an understanding of the present invention.

The embodiments of the invention in which an exclusive property or privilege is claimed are defined as follows:

1. An energy recovery system for collecting and utilizing heat energy dissipated from a plurality of relatively low, different temperature secondary heat sources in an industrial plant or other installation, the system comprising:
   heat pump means including a refrigeration unit consisting of an evaporator, a condenser, and means for condensing said refrigerant in said condenser, and vaporizing said refrigerant in said evaporator, whereby heat energy is transferred from said evaporator into said condenser;
   collection heat transfer means associated with each of said secondary waste heat sources causing transfer of heat from said secondary heat sources into said evaporator of said heat pump means, comprising: a plurality of heat exchanger means, one each associated with each of said secondary heat sources and means for transferring heat from said secondary heat sources into said respective associated heat exchanger means and further including a heat transfer medium circulated through each of said plurality of heat exchanger means; a cool temperature thermal storage tank means; means for collecting the heat transfer medium flow circulated through each of said heat exchanger means into said cool temperature thermal storage tank; means for transferring heat from said cool temperature thermal storage tank means into said evaporator associated with said heat pump means, said cool temperature thermal storage tank means further including means for collecting quantities of heat transfer media flow from respective different temperature secondary heat sources in respective different spaces within said cool temperature thermal storage tank means; segregation means for separately maintaining heat transfer media of differing temperatures in said respective different spaces preventing intermixing thereof and maintaining the maximum thermal energy of said heat transfer media received from said plurality of heat exchanger means associated with each of said secondary heat sources;
   at least one heat using process device;
   process utilization heat transfer means causing heat transfer from said condenser of said heat pump means to at least one heat utilizing process device;
   whereby said heat transfer from said relatively low temperature heat sources into said evaporator and said transfer by said heat pump into said condenser enables said utilization of said heat in said at least one heat utilizing process device.

2. The energy recovery system according to claim 1 wherein said cool temperature thermal storage tank means includes a vertically extending tank and wherein said heat transfer medium comprises a substance having a varying density corresponding to said different temperatures to provide said segregation means by a vertical stratification of said heat transfer medium in said cool temperature thermal storage tank means and wherein said means for collecting quantities of heat transfer media flow includes means for introducing said heat transfer media flow from each of said respective heat exchanger means into said cool temperature thermal storage tank means at respective different vertical levels, whereby said heat transfer media received from said plurality of heat exchanger means are introduced at vertical levels corresponding to the different temperature levels of said heat transfer media associated with the respective heat exchanger means.

3. The energy recovery system according to claim 1 wherein said cool temperature thermal storage tank means comprises a reservoir and wherein said segregation means comprises horizontally spaced compartments formed therein and wherein said means for collecting said quantities of heat transfer media flow includes means for directing said heat transfer media flow from respective heat exchanger means into differing compartments in said reservoir, whereby said differing temperature heat transfer media flows from said respective heat exchanger means are maintained in said reservoir in different compartments therein.

4. The energy recovery system according to claim 1 wherein said cool temperature thermal storage tank means includes a vertically extending tank and wherein said means for collecting said quantities of heat transfer media flow further includes a plurality of vertically extending probes positioned extending into said cool temperature thermal storage tank means and having terminal end portions thereof at differing depths in said thermal storage tank and further including means directing flow from each of said plurality of heat exchanger means into a respective vertical probe, whereby said heat transfer media may be introduced into said cool temperature thermal storage tank means at differing levels therein, and thermal stratification maintains quantities of said heat transfer media at differing temperatures therein to provide said segregation means.

5. The energy recovery system according to claim 4 further including means for movably positioning said vertically extending probes in said cool temperature thermal storage tank means whereby each of said vertically extending probes may be positioned at varying levels therein.

6. The energy recovery system according to claim 1 wherein said process utilization heat transfer means includes a warm temperature thermal storage tank means and also includes means for circulating a heat transfer media from said warm temperature thermal storage tank means to each of said at least one of said heat utilizing process devices.

7. The energy recovery system according to claim 6 wherein said warm temperature thermal storage tank means includes means for distributing said heat transfer media in said warm temperature thermal storage tank means at differing temperatures therein, and further including means for withdrawing said heat transfer media circulating to said at least one heat utilizing process device from differing points in said temperature differed distribution thereof.

8. The energy recovery system according to claim 6 wherein said warm temperature thermal storage tank means includes means for collecting said heat transfer media in said thermal storage tank with a differing temperature distribution therein and further including means for circulating said heat transfer media from said warm temperature thermal storage tank means through said heat pump means condenser and wherein said means for causing said circulation of said heat transfer media over said heat pump means condenser comprises means for withdrawing said heat transfer media from said differing points in said heat transfer media at varying temperatures thereof, whereby the temperature of said heat transfer media circulated over said heat pump condenser corresponds to the temperature of said mixture of said heat transfer media from varying points in said temperature differed distribution thereof.

9. The energy recovery system according to claim 8 wherein said heat utilizing process device transfer means further includes means for varying the temperature of said heat transfer media circulated through said heat pump means condenser.

10. The energy recovery system according to claim 9 wherein the means for varying the temperature of said media circulating through said heat pump means condenser comprises mixing valve means for mixing varying proportions of said heat transfer media received from said varying locations within said warm temperature thermal storage tank means.

11. The energy recovery system according to claim 10 wherein said means for varying the temperature of said heat transfer media comprises means for varying the location within said warm temperature thermal storage tank means whereat said heat transfer media is withdrawn, whereby said temperature of said heat transfer media circulated over said heat pump means condenser may be varied.

12. The energy recovery system according to claim 7 wherein said warm temperature thermal storage tank means includes a vertically extending tank and wherein said heat transfer medium comprises a substance having a varying density corresponding to said differing temperature levels, whereby stratification of said heat transfer media occurs in said warm temperature thermal storage tank means and further includes means for directing said heat transfer media flow from said warm temperature thermal storage tank means for varying vertical levels to each of said at least one heat utilizing process, whereby said heat transfer media directed thereto are directed from vertical levels corresponding to the differing temperature levels of said heat transfer media.

13. The energy recovery system according to claim 7 wherein said warm temperature thermal storage tank means comprises a reservoir having horizontally spaced compartments therein and further includes means for directing said heat transfer media flow to each of said respective heat utilizing processes from differing compartments in said reservoir.

14. The energy recovery system according to claim 7 wherein said warm temperature thermal storage tank means includes a vertically extending tank and further includes a plurality of vertically extending probes positioned extending into said warm temperature thermal storage tank means and having terminal end portions thereof at differing depths in said thermal storage tank and said process utilizing heat transfer means including means directing flow to each of said at least one heat utilizing process devices through a respective vertical probe, whereby said heat transfer media may be withdrawn from said warm temperature thermal storage tank means at differing levels therein, whereby thermal stratification may deliver quantities of said heat transfer media at differing temperatures thereof.

15. The energy recovery system according to claim 1 wherein said process utilizing heat transfer means comprises means for circulating a heat transfer medium to and from each of said utilization heat process device, and wherein said thermal storage tank means comprises a plurality of thermal storage tanks, and wherein said heat pump means comprises a plurality of heat pump units connected in cascade arrangement, and wherein said cascade arrangement is provided by means for circulating the transfer media circulated into said one of plurality of thermal storage tanks from one of said condensers of one of said plurality of heat pump means about a succeeding heat pump unit means evaporator in said cascade.

16. The energy recovery system according to claim 15 wherein said collection heat transfer means comprises means for directing said media flow received from a respective one of a plurality of said heat exchanger means into differing ones of said plurality of said thermal storage tank means, whereby heat transfer media received from said respective heat exchanger means of differing temperatures may be collected in different thermal storage tank means.

17. The energy recovery system according to claim 1 wherein said heat pump means comprises a compressor and steam turbine means for rotating said compressor, and further including heat exchanger means collecting the steam passed through said steam turbine means, including thermal storage means receiving said steam, heat transfer media circulated through said heat exchanger means and means for circulating said heat transfer media through said at least one heat utilizing process device.

18. The energy recovery system according to claim 1 wherein said collection heat transfer means includes a plurality of mains extending about said plant receiving heat transfer media flow, and wherein said differing temperature media flows are collected in respective means.

19. A method of recovering heat energy from a plurality of different temperature secondary heat sources located in varying locations within an industrial plant or similar installation, the method comprising the steps of:

transferring heat from each of said secondary heat sources to the evaporator of a heat pump unit including the steps of: circulating a heat transfer medium through a heat exchanger means associated with each of said secondary heat sources; collecting quantities of said heat transfer media in a common thermal storage tank received from respective different flows from each of said heat exchangers at varying locations in said common thermal storage tank; segregating the respective differing temperature quantities of collected heat transfer media from each other;

transferring heat rejected in the condenser of said heat pump unit to heat using process devices, whereby the heat energy may be recovered from said secondary heat source at relatively low different temperatures and utilized at relatively high temperatures by operation of said heat pump unit.

20. The method according to claim 19 wherein in the step of transferring heat from said heat pump unit condenser to the heat using process devices includes the step of circulating a heat transfer medium about said condenser and into a thermal storage tank and wherein said step further includes the step of varying the temperature of liquid withdrawn from said thermal storage tank means and circulated about said condenser coils whereby the operating temperature of said condenser may be varied to optimize the efficiency of said heat pump unit.

* * * * *